United States Patent
Mell et al.

[11] 3,802,099
[45] Apr. 9, 1974

[54] METHOD AND APPARATUS FOR TRAINING POLICEMEN

[75] Inventors: Leonard E. Mell, Orange; Loran A. Norton, Santa Ana; David Keith Crosser, Placentia, all of Calif.

[73] Assignee: Carter Industries, Inc., Santa Ana, Calif.

[22] Filed: Sept. 25, 1972

[21] Appl. No.: 292,105

[52] U.S. Cl. ................................. 35/25, 273/101.1
[51] Int. Cl. ............................................. F41j 1/00
[58] Field of Search .......... 35/25; 273/101.1, 102.1, 273/102.2, 105.1

[56] References Cited
UNITED STATES PATENTS
| | | | |
|---|---|---|---|
| 2,957,695 | 10/1960 | DeValle Arizpe | 273/105.1 |
| 1,035,811 | 8/1912 | Paterson | 273/102.2 |
| 2,404,653 | 7/1946 | Plebanek | 273/101.1 |

Primary Examiner—Harland S. Skogquist
Assistant Examiner—J. H. Wolff
Attorney, Agent, or Firm—Gausewitz, Carr & Rothenberg

[57] ABSTRACT

The present apparatus provides an accurate simulation of the environment in which a police trainee may later find himself during continuance of an emergency condition, such as a confrontation with a killer. The apparatus fills the void between traditional training and actual field conditions, and permits the trainee to interact with the simulated environment in a highly realistic manner. The apparatus includes a plurality of film projectors and tape decks, a screen on which the films are projected, sensing devices to determine whether or not the trainee has fired his gun or has hit a predetermined portion of the screen, logic and control devices interrelated to the film and adapted to cause different operations of the projectors and tape decks in accordance with the actions of the trainee, and simulating devices intended to make the trainee feel that he himself has been hit by a bullet in the event that his prior performance was unsatisfactory.

The method relates to a predetermined manner of interrelating the various apparatus in order to achieve the maximum degree of training effectiveness.

10 Claims, 5 Drawing Figures

METHOD AND APPARATUS FOR TRAINING POLICEMEN

BACKGROUND OF THE INVENTION

1. Field of the Invention

This invention relates to the field of methods and apparatus for training policemen and others who are required to employ guns during periods of critical emergency.

2. Description of Prior Art

There exist prior-art patents which relate to the teaching of military trainees to shoot various types of weapons at the projected images of moving targets, relate to the shooting at targets in amusement parts, and relate to sports-training equipment (for example, teaching golfers to hit golf balls correctly). However, insofar as is known to applicants, there does not now exist a training method or apparatus which permits law enforcement trainees, etc., to become totally involved with what is occurring on a screen and to interact realistically with various environment-simulating devices. More specifically, prior art known to applicants does not cause the projected images to change in certain ways, and to shoot at the trainee, in accordance with whether or not the trainee fires accurately at the correct target during the correct time interval. Furthermore, the prior art does not subject the trainee, if he does not perform properly, to a psychological simulation of some of the adverse consequences which he might suffer if he were shot and wounded by a suspect.

SUMMARY OF THE INVENTION

The apparatus comprises a projection screen having at least one portion which is a predetermined target area, such portion being associated with a sensing means adapted to determine when the target area is struck by a projectile. A plurality of film projectors are provided in order to effect sequential showing of photographic and other images on the screen. Sensing and logic means correlate the target area of the screen with certain portions of a motion picture film being projected by one of the projectors, and correlate a microphone with other portions of such motion picture film. The sensing and logic means are associated with control means for the projectors, and also with tape deck and loudspeaker means. Furthermore, the sensing and logic means are associated (when still different portions of the film are being projected) with control means for apparatus adapted to make the police trainee exerience psychologically some of the feelings which may be incident to being wounded by a bullet.

In accordance with the method, a motion picture film is projected on the screen by one of the projectors, and incorporates a sequence of images showing a decoy or false target which should not be shot at by the trainee. If, however, the trainee shoots at the decoy, the film is stopped and turned off, and a second film is projected on the screen in order to show the decoy in a dead or dying condition. Furthermore, a tape deck is actuated to inform the trainee that he made a mistake. If the trainee does not shoot the decoy, the motion picture film is continued to show the true suspect or target, who should be shot by the trainee. Shooting of the correct target area of the suspect, during a predetermined correct time period, causes the film to stop, causes an image of the dead or dying suspect to be projected, and activates a tape deck to inform the trainee that he has performed well. If the correct target area is not hit during the proper time interval, the motion picture film continues and shows the suspect shooting the trainee. The trainee is then subjected to various effects which psychologically simulate being wounded.

DETAILED DESCRIPTION OF THE PREFERRED EMBODIMENT:

Throughout this specification and claims, the "trainee" is the policeman or other individual who is employing the apparatus in order to learn how to react properly under emergency conditions. The "decoy" is an individual who may give the appearance of a criminal but who, actually, is innocent and should not be shot. The "suspect is the actual criminal who is armed and dangerous and who will, unless shot by the trainee, effect his killing or wounding.

Figure 1:
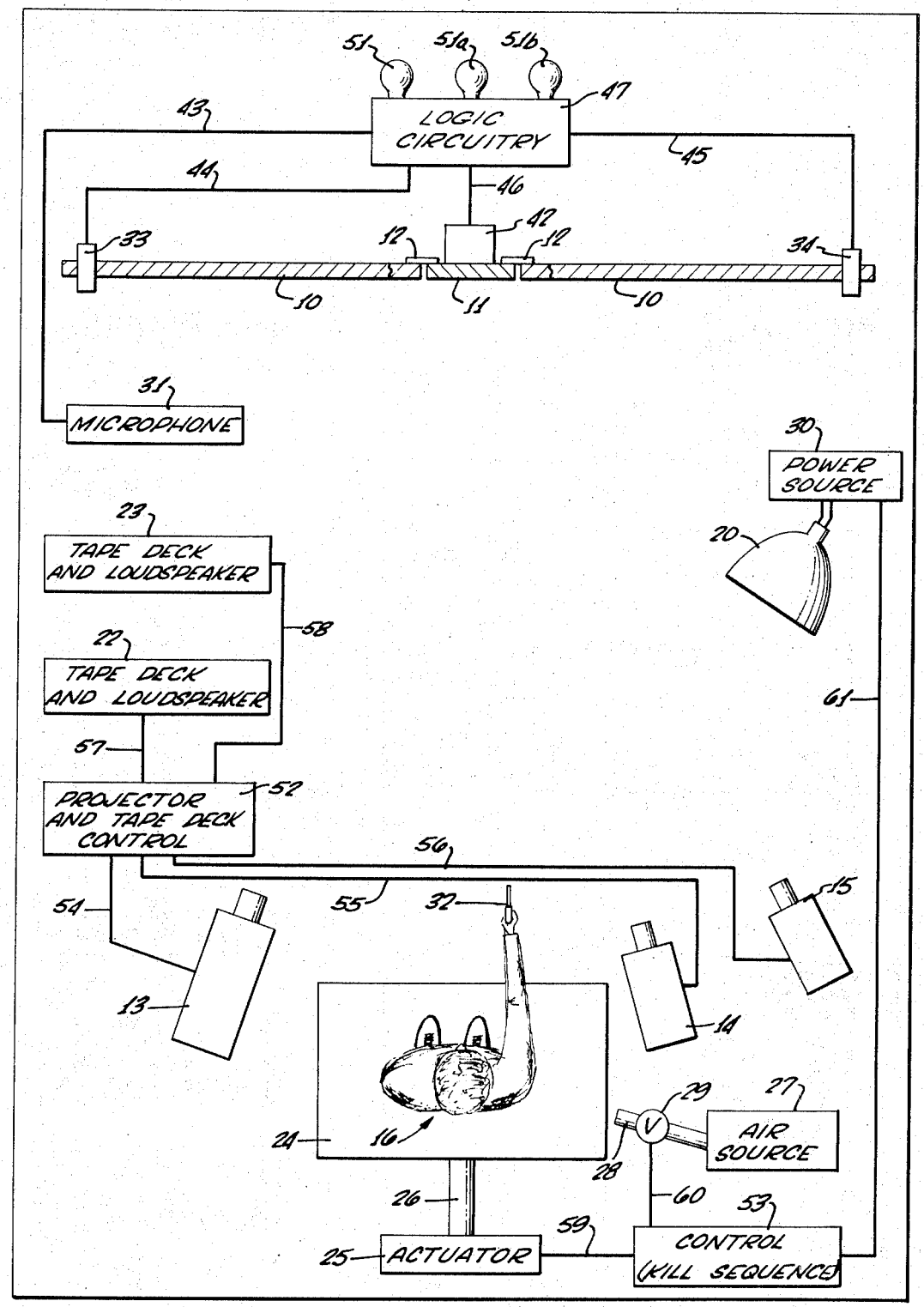
FIG. 1 is a diagrammatic top plan view, but showing the projection screen in horizontal section, and which illustrates the trainee in the position assumed during the training operation.

Referring first to FIG. 1, the entire illustrated apparatus is enclosed in a room or booth which is maintained in a relatively dark condition, and is free of extraneous light sources. At one end of the room or booth is a projection screen 10 which is solid at all portions thereof except at one (or more) predetermined target area 11. Such target area 11 is not rigidly connected to the remainder of screen 10, being instead connected thereto (or to another suitable support means) by resilient elements such as the strap springs which are indicated at 12.

The location of target area 11 is accurately correlated to the location of the heart of the suspect during a certain period while the suspect is shown on the screen as described below relative to FIG. 3b. Stated otherwise, the image of the "heart area" of the chest of the suspect is projected onto target area 11 during the stated time. Such coincidence between the location of target area 11, and the location of the heart of the projected suspect image when the film portion of FIG. 3b is on the screen, only occurs during a relatively short predetermined time period. It is during this time period that the trainee must, in order to perform the training exercise satisfactorily, shoot the heart of the projected image of the suspect and thus hit the target area 11.

The apparatus of FIG. 1 further comprises a plurality, illustrated as three, of film projectors 13, 14 and 15 all directed at the projection screen 10. Projector 13 is a motion picture projector, of a suitable type which not only projects onto screen 10 the images on a motion picture film, but also generates sound which is synchronized with and audibly reproduces words being spoken by the projected images of the decoy and suspect. The sound also comprises background description by a narrator. Such sound is heard by the trainee, who is shown at 16, either by means of a loudspeaker or by use of headphones, not shown.

Figure 3A:
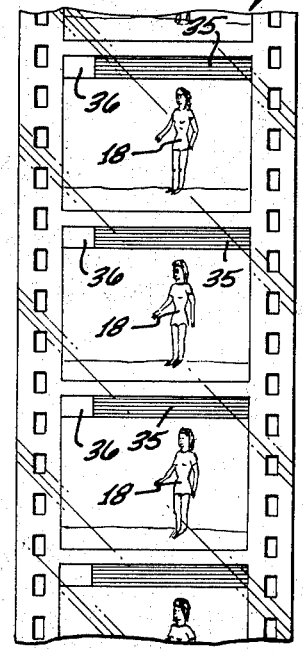
FIGS. 3a, 3b and 3c illustrate sections of motion picture film and which are coded in such manner as to inform the logic circuitry which portions of the film are being projected on the screen.
Figure 3B:
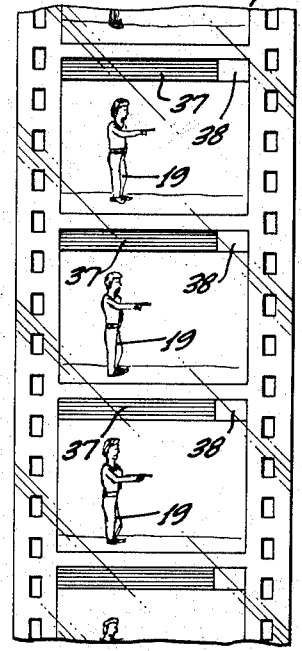
Figure 3C:
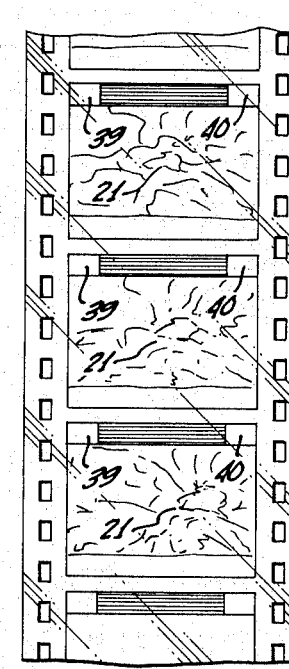

The motion picture film 17 which is projected by projector 13 is indicated, in part, in FIGS. 3a, 3b and 3c. Another portion of the film not shown, is projected by the projector 13 prior to projection of any of the film portions of FIGS. 3a, 3b or 3c. Such prior film portion illustrates the environmental situation at which the confrontation will take place. For example, the environment may comprise a barroom at which an armed robbery is in progress. The film sound track associated with such prior portion of the film 17 also explains the general situation to the trainee, in a "you are there" manner.

There is next projected by motion picture projector 13 the portion 17a of the film (FIG. 3a), which portion shows the decoy 18. Thereafter, if the trainee doesn't shoot at the image of the decoy, there is projected by projector 13 the portion 17b of the film (FIG. 3b), and which shows the suspect 19. There is next projected by projector 13 the portion 17c of the film (FIG. 3c), which comprises strange moving color patterns 21 psychologically simulative of unconsciousness. Such portion 17c of the film should not be projected if the trainee has fired at the image of the suspect 19, during the correct time period, and has hit the target area 11 of screen 10.

It is emphasized that the sound track, not shown, of the film 17 contains (in addition to words) all suitable sound effects such as gunshots, fight noises, crowd noise, and everything else realistically associated with the images being projected on the screen.

The second projector 14 is preferably a motion picture projector, but may be an automatic slide projector adapted to effect rapid-sequence projection of sequentially related slides on the projection screen 10. The images projected onto the screen by projector 14 (whether it is a motion picture projector or a slide projector) show the decoy 18 falling and dying.

Similarly to the case relative to projector 14, the third projector 15 is preferably a motion picture projector but may be an automatic slide projector. The images projected onto the screen 10 by projector 15, whether it is a motion picture projector or slide projector, show the suspect 19 falling and dying. It is within the scope of the invention to provide means whereby the projectors 14 and 15 show the decoy and/or the suspect being wounded, or following some other representative course of action, instead of falling and dying.

Although projectors 14 and 15 may be sound-type projectors, it will be assumed that they are not. Thus, tape decks are provided as stated below.

Preferably, each of projectors 14 and 15 is a motion picture projector containing a short closed-loop length of motion picture film, not shown. The closed-loop length of film shows the entire sequence and then automatically stops the associated projector as soon as the beginning point is reached. Similarly, projector 13 is preferably a motion picture projector containing a longer length of closed-loop film, which also stops itself as soon as the beginning point is reached in the closed-loop film.

Relative to each of projectors 13–15, the film effects stopping of the projectors (when the beginning point is reached) in ways well known in the art, for example by mounting a suitable indicating means (such as a short length of metal strip) on the film, and causing a switching means (for example, two probes adapted to be electrically connected to each other by the metal strip) in the projector to sense when the indicating means reaches a predetermined point corresponding to the beginning and ending point of the film. Each of the projectors 13–15 is started by receiving a suitable electrical pulse, which operates a relay and holding circuit (not shown) to maintain the respective projectors in operation until automatically stopped as stated. It is pointed out that the projectors 13, 14 and 15 do not operate at the same time, but in sequence in accordance with the present method as described hereinafter.

It is within the scope of the invention to provide a plurality of motion picture projectors operating in synchronism with each other, and containing films related to each other in a certain manner. Masking or other means are then employed to switch back and forth between the projectors, quickly, only one film being seen at any one time. The switching is responsive to the actions of the trainee.

There is provided a combination tape deck and loudspeaker 22 which is activated simultaneously with activation of projector 14, and contains a tape which explains to the trainee 16 that he has made a mistake. More specifically, the tape explains to the trainee that he should not have shot the decoy 18. Correspondingly, there is provided a tape deck and loudspeaker 23 which is activated simultaneously with activation of projector 15, and which informs the trainee 16 that he has performed correctly and has shot and killed the suspect 19. Each of the tapes incorporated in units 22 and 23 is preferably of the closed-loop type adapted automatically to shut the unit off, as described relative to projectors 13–15. The duration of the recorded message on the tape in each of units 22 and 23 corresponds to the duration of the film projection periods, respectively, of projectors 14 and 15.

There will next be described the means for causing the trainee 16 to receive sensory impressions simulative of those which might occur in the event that he himself were wounded or dying. These sensory impressions do not actually harm the trainee in any way but do give him a psychological jolt. One such means is a horizontally movable rectangular platform 24, on which the trainee stands throughout the entire operation. The platform is suddenly moved horizontally, through a short distance such as one or two inches, in response to operation of an actuator 25 which connects to the platform by means of a connecting rod 26. When the platform 25 suddenly and unexpectedly moves, the stability of the trainee 16 is interrupted, and he is given some of the sensations which would occur if he were falling.

Another such means is an air source 27 which contains air under pressure (or contains a blower) and connects through a conduit 28 to a point adjacent the trainee 16. A solenoid valve 29 incorporated in conduit 28 is automatically opened, as described below, causing the source 27 to blow air through conduit 28 at the head of the trainee 16.

A further psychological effect is created by a strobe light 20 which is associated with a power source 30, and which flashes a bright light toward the trainee 16 at short intervals.

Other psychological impressions result from the fact that the trainee sees projected on screen 10 by motion picture projector 13 the images or patterns present on the film strip 17c shown in FIG. 3c. In addition, the sound track associated with film strip 17c may generate strange noises adapted to enhance the psychological or psychedelic effect being produced.

It is pointed out that platform 24 also performs the important function of locating the trainee relative to the screen. Therefore, the suspect image on the screen will appear to shoot directly at the trainee. Desirably, the platform location is correlated to the location of the camera which exposed the motion picture film 17.

DESCRIPTION OF THE SENSING, LOGIC AND CONTROL MEANS

The sensing means comprises a sensor 31 which is a microphone adapted to sense the sound created by firing of a gun 32 employed by the trainee 16. The microphone 31 is insensitive to other sounds. The gun 32 may be a standard service revolver adapted to fire a plastic projectile which will create a substantial impact on target area 11 but will not be damaging or dangerous. The plastic projectile may be fired by the primer powder alone; there need be no other powder contained within the cartridge in gun 32.

Two additional sensors 33 and 34 are provided in the form of photodetectors which are located, respectively, at the upper lefthand and upper right-hand corners of projection screen 10. The locations of photodetectors 33 and 34 are correlated, respectively, to the locations of coded information on the film strips 17a, 17b and 17c (FIGS. 3a–3a–).

Referring first to FIG. 3a, the entire upper portion of each frame of the motion picture film scene is caused to be black, as indicated at 35, except at a light-transmissive film portion 36 which is provided at the upper left-hand corner of each frame. Portion 36 is adapted to permit transmission of light from the projection lamp to photodetector 33, thus activating the latter. During this period, photodetector 34 is not activated since light transmission thereto is prevented by the black portion 35. It will be remembered that the film strip 17a is the one which contains the images of the decoy.

Referring next to FIG. 3b, which is the scene containing the images of the suspect, the entire upper portion of each frame is black, as shown at 37, except at the upper right-hand corner which has a light-transmissive opening 38. Opening 38 permits transmission of light from the projection lamp to photodetector 34, whereas black portion 37 blocks transmission of light to the detector 33.

In the film strip of FIG. 3c, there are light-transmissive openings at both the upper left-hand corner and the upper right-hand corner of each frame, as shown respectively at 39 and 40. Thus, when the scene of film strip 17c is being projected on the screen 10, both photodetectors 33 and 34 are simultaneously activated. It is to be remembered that this film strip 17c is the one which is projected immediately after the suspect film strip 17b has been projected.

The remaining sensor, indicated at 42, is a piezoelectric transducer adapted to sense when the target area 11 of projection screen 10 has been hit by a projectile (namely, by the plastic bullet). When the target area is thus hit, a voltage pulse is produced due to the fact that target area 11 moves slightly as permitted by the springs 12. The piezoelectric transducer may be, for example, a cartridge of the kind used in a phonograph turntable.

Figure 2:
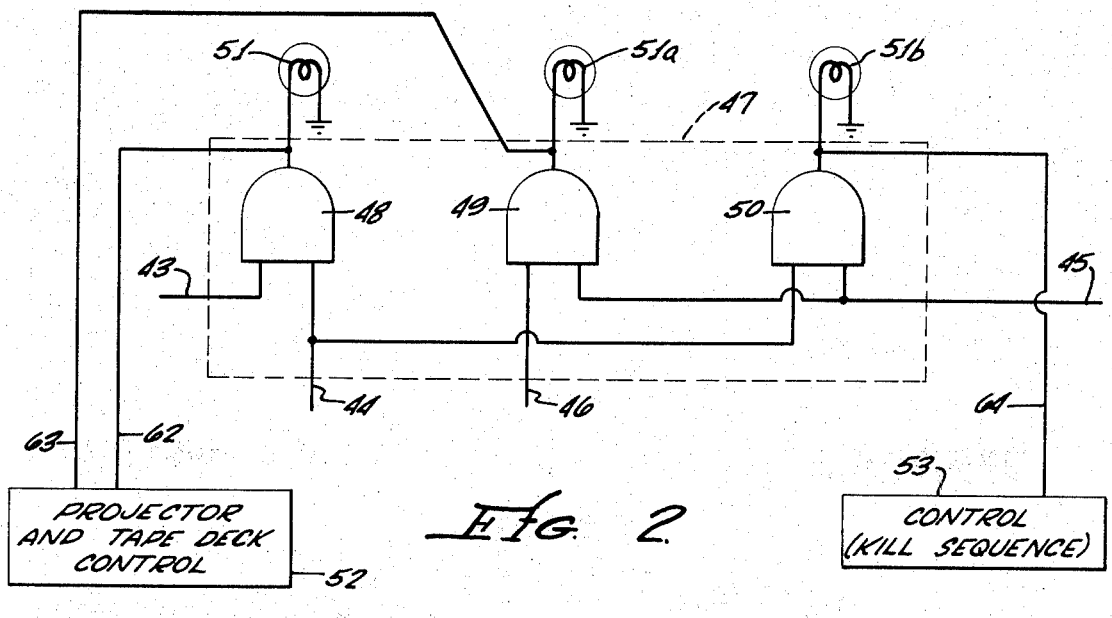
FIG. 2 is a diagram showing the logic circuitry which is illustrated at the upper portion of FIG. 1, in combination with control circuits for the projectors and tape decks and for the kill-simulating apparatus.

Sensors 31, 33, 34 and 42 are connected, respectively, by wires 43–46 to logic circuitry indicated generally at 47. Referring to FIG. 2, the logic circuitry 47 comprises three AND gates 48, 49 and 50 the outputs of which are adapted, respectively, to energize lamps 51, 51a and 51b. AND gate 48 has two inputs which are respectively connected to wires or leads 43 and 44, the result being that lamp 51 is illuminated in response to the receipt of a signal from the microphone 31 during a period when photodetector 33 is energized.

The two inputs of AND gate 49 are connected, respectively, to leads 45 and 46, so that lamp 51a is illuminated in response to receipt of a signal from piezoelectric transducer 42 during a period when photodetector 34 is energized. The inputs of AND gate 50 are connected, respectively, to the two photodetectors 33 and 34, the result being that lamp 51b is illuminated when both photodetectors are energized (namely, when film strip 17c of FIG. 3c is being projected on the screen).

The control circuitry comprises a projector and tape deck control 52, and a control (kill sequence) 53. The projector and tape deck control 52 incorporates a plurality of switches adapted to effect starting of the three projectors 13–15 and the two tape decks 22 and 23. This is effected by means of current transmitted through leads 54, 55, 56, 57 and 58.

The kill-sequence control 53 (thus named because it operates when the trainee is being wounded or killed) incorporates switching means associated with the actuator 25, with the valve 29 for air source 27, and with the power source 30 for strobe light 20. The lead from control 53 to actuator 25 is numbered 59; that to valve 29 is numbered 60; and that to power source 30 is numbered 61.

Projector 13 is started by switch means on control 52, and continues until manually or automatically stopped. Projector 14 and tape deck 22 are started simultaneously by control 52, either manually or automatically, and continue for the same length of time after which they either shut themselves off (as described above) or are shut off by switch means on the control 52. The projector 15 and the tape deck 23 are started simultaneously by the control 52, either manually or automatically, and continue for the same length of time after which they either shut themselves off (as described above) or are shut off by switch means on the control 52.

The various kill-sequence elements 25, 29 and 30 are activated simultaneously by the kill-sequence control 53 and continue until manually or automatically shut off.

The two control elements 52 and 53 may be disposed adjacent each other and operated by an operator, in manual manner, the operator pressing and releasing various switches. Preferably, however, no such operator is necessary. Instead, the control elements 52 and 53 function automatically in response to the logic 47, and incorporate suitable relay and other means to effect the described operation of the projectors, tape decks, kill-sequence elements, etc. For such automatic operation, the outputs of the respective AND gates 48 and 49 are connected through leads 62 and 63 to control 52, whereas the output of gate 50 is connected through lead 64 to control 53.

DESCRIPTION OF THE METHOD

In the following description of the method, it will be assumed that the controls 52 and 53 are operated manually by an operator, who is pressing and releasing switches, although it will be understood that the apparatus may also (preferably) be operated automatically and independently of any operator.

The law enforcement trainee 16 mounts the movable platform 24, and picks up the gun 32. The operator then actuates a switch on control 52 to effect starting of the motion picture sound projector 13. The trainee then sees on screen 10 a projected motion picture image of a scene, for example a barroom, where (for example) a robbery is in progress. He also hears a "you are there" narrator's description of the circumstances of the hypothetical situation.

The film strip portion 17a (FIG. 3a) then passes through the projector, so that the image of the decoy 18 is projected on screen 10. The decoy moves and talks in such manner as to induce an inexperienced police officer to fire at her, despite the fact that an experienced officer would not. As soon as the decoy appears on the screen, light projected through opening 36 in film strip portion 17a (FIG. 3a) activates the photodetector 33 to thereby set up an AND gate 48 for energization of lamp 51 in response to firing of a shot by gun 32 while the image of decoy 18 remains on the screen. If the trainee 16 then fires the gun 32, the sound is sensed by microphone 31, and causes the AND gate to energize light 51. The operator then actuates switches on control 52 to turn off the projector 13, and substantially simultaneously activate the projector 14 as well as the tape deck and loudspeaker 22. Projector 14 projects on screen 10 images of the decoy falling and dying, whereas the tape deck and loudspeaker explains to the trainee 16 that he has made a mistake. At the end of this sequence, both elements 22 and 14 are shut off by the operator, operating the control 52, or else they shut themselves off as described above.

The operator then has the election of either starting the entire method over, or else continuing from the point at which the projector 13 was stopped. Assuming the latter to be the case, the operator operates a switch on control 52 to again start projector 13. This causes film strip portion 17b (FIG. 3b) to be projected on the screen, so that the image of the suspect 19 appears. The image of the suspect acts and talks in such manner that an experienced police officer would shoot him. Light passing through opening 38 in film strip 17b then (during a precise, predetermined time period) activates the photodetector 34, to set up the AND gate 49 for illumination of lamp 51a in response to striking of target 11 by the projectile from gun 32.

Thus, if the trainee 16 fires gun 32 and hits area 11 during, and only during, the predetermined time period when the suspect 19 is on the screen and is in the predetermined position correlated to the target area 11, the lamp 51a will be illuminated. If this occurs, the operator will see the lamp 51a light and will immediately actuate switches on control panel 52 to turn off the projector 13 and simultaneously activate the projector 15 and the tape deck and loudspeaker means 23. The projector 15 then shows the suspect falling and dying, and the tape deck and loudspeaker 23 explains to the trainee that he has acted in a proper and correct manner.

It is pointed out that the length of time during which the trainee may fire effectively is determined by the number of film frames containing openings 38.

In the event that the target area 11 is not struck by the projectile during the predetermined time period while the image 19 of the suspect is on the screen, the film strip 17c (FIG. 3c) comes on the screen and causes simultaneous activation of both photodetectors 33 and 34. Lamp 51b is then illuminated, which is a signal to the operator that he should operate the control 53 to effect simultaneous operation of all of the kill-sequence devices 25, 29 and 30. Actuator 25 then effects horizontal jerking of platform 24 to startle the trainee 16, valve 29 is opened to cause air from source 27 to pass through tube 28 and blow in the face of the trainee, and power source 30 is activated to cause strobe lamp 20 to flash a bright light in the face of the trainee. Furthermore, as shown in FIG. 3c, the projector 13 then projects weird psychedelic images on the screen. The total result is a psychological simulation of wounding or dying of the trainee 16.

It is emphasized that the present simulator may be made more complex and elaborate than that which is described above. For example, a riot may be simulated, complete with throwing of bricks at the trainee. In addition, it is pointed out that other environment simulating means may be provided, for example to generate odors simulative of those present at the scene.

The code means on film 17 (namely, openings 36, 38, 39 and 40) and the photodetectors 33 and 34 may in some cases be replaced by other types of correlating means. For example, means may be provided to count the frames of the film. As another example, signal means may be provided on the sound track of the film.

It is within the scope of the appended claims to employ reverse logic. Thus, for example, the motion picture film 17 may have a first portion showing the suspect in the act of performing antisocial behavior, and a second portion showing the suspect in a killed or wounded condition. The logic and control circuitry would then, in response to failure of the trainee to hit target area 11 during the predetermined time period, stop the film 17 and substitute a film showing the suspect shooting at the trainee.

The projectors may be replaced by other image reproducers, for example of the video tape type, without avoiding the accompanying claims.

The foregoing detailed description is to be clearly understood as given by way of illustration and example only, the spirit and scope of this invention being limited solely by the appended claims.

We claim:

1. A training method for simulating the environment incident to a law enforcement confrontation, which comprises:

a. projecting on a screen a motion picture film scene showing a hypothetical suspect who is about to commit, or is in the act of committing, antisocial behavior of such nature that a law enforcement officer should shoot said suspect, b. determining whether or not a law enforcement trainee has shot accurately at a predetermined area of said screen during a predetermined time period when a part of the body of said suspect was being projected on said predetermined area, and c. following one of a plurality of alternative procedures depending upon whether or not said shot was accurately directed at said predetermined area during said predetermined time period, one of said procedures being followed if said shot was accurately directed at said predetermined area during said predetermined time period, and comprising projecting on said screen a second film scene which shows said suspect in a wounded or killed condition, another of said procedures being followed if said shot was not accurately directed at said predetermined area during said predetermined time period, and comprising projecting on said screen another film scene showing said suspect shooting at said trainee, d. causing said trainee to employ a pistol which shoots a projectile at said screen, and effecting said determination of whether or not said shot was accurately aimed by means of an impact-sensing means associated with said predetermined area of said screen, e. providing code means on said film to determine said predetermined time period, and effecting said determination of whether or not said shot was accurately directed by ANDing a signal from said impact-sensing means with a signal generated in response to said code means.

2. A training method for simulating the environment incident to a law enforcement confrontation, which comprises:

a. projecting on a screen a motion picture film scene showing a hypothetical suspect who is about to commit, or is in the act of committing, anitsocial behavior of such nature that a law enforcement officer should shoot said suspect, b. determining whether or not a law enforcement trainee has shot accurately at a predetermined area of said screen during a predetermined time period when a part of the body of said suspect was being projected on said predetermined area, and c. following one of a plurality of alternative procedures depending upon whether or not said shot was accurately directed at said predetermined area during said predetermined time period, one of said procedures being following if said shot was accurately directed at said predetermined area during said predetermined time period, and comprising projecting on said screen a second film scene which shows said suspect in a wounded or killed condition, another of said procedures being followed if said shot was not accurately directed at said predetermined area during said predetermined time period, and comprising projecting on said screen another film scene showing said suspect shooting at said trainee, d. determining said predetermined time period by determining which frames of said motion picture film are being projected by the projector for said motion picture film.

3. A training method for simulating the environment incident to a law enforcement confrontation, which comprises:

a. projecting on a screen a motion picture film scene showing a hypothetical suspect who is about to commit, or is in the act of committing, antisocial behavior of such nature that a law enforcement officer should shoot such suspect, b. determing whether or not a law enforcement trainee has shot accurately at a predetermined area of said screen during a predetermined time period when a part of the body of said suspect was being projected on said predetermined area, and c. following one of a plurality of alternative procedures depending upon whether or not said shot was accurately directed at said predetermined area during said predetermined time period, one of said procedures being followed if said shot was accurately directed at said predetermined area during said predetermined time period, and comprising projecting on said screen a second film scene which shows said suspect in a wounded or killed condition, another of said procedures being followed if said shot was not accurately directed at said predetermined timer period, and comprising projecting on said screen another film scene showing said suspect shooting at said trainee, d. creating, after said following of said other of said procedures, psychological responses in said trainee and which simulate the wounding of said trainee, creating one of said psychological responses by causing said trainee to be standing on a platform, and then suddenly moving said platform at about the same time that the projected image of said suspect shoots at said trainee.

4. A training method for simulating the environment incident to a law enforcement confrontation, which comprises:

a. projecting on a screen a motion picture film scene showing a hypothetical suspect who is about to commit, or is in the act of committing, antisocial behavior of such nature that a law enforcement officer should shoot said suspect, b. determining whether or not a law enforcement trainee has shot accurately at a predetermined area of said screen during a predetermined time period when a part of the body of said suspect was being projected on said predetermined area, and c. following one of a plurality of alternative procedures depending upon whether or not said shot was accurately directed at said predetermined area during said predetermined time period, one of said procedures being followed if said shot was accurately directed at said predetermined area during said predetermined time period, and comprising projecting on said screen a second film scene which shows said suspect in a wounded or killed condition, another of said procedures being followed if said shot was not accurately directed at said predetermined area during said predetermined time period, and comprising projecting on said screen another film scene showing said suspect shooting at said trainee, d. creating, after said following of said other of said procedures, psychological responses in said trainee and which simulate teh wounding of said trainee, and creating one of said psychological responses by projecting images of psychologically impressive patterns on said screen.

5. A method of training a law enforcement trainee by simulating realistically a law enforcement emergency condition involving a confrontation between the trainee and a suspect, which method comprises:

a. providing a projection screen incorporating a target area which is associated with means to determine whether or not a projectile strikes said target area, b. causing the trainee to be located in a predetermined position relative to said screen, c. projecting on said screen a motion picture film which shows the environment of a location where a confrontation is taking place or is about to take place, d. projecting on said screen a motion picture film showing a decoy, e. determining whether or not the trainee fires a weapon while the image of said decoy is being projected on said screen, f. stopping the training procedure if said trainee does fire his weapon, and communicating to the trainee the information that he had made a mistake, g. projecting on said screen a motion picture film showing a suspect, h. determining whether or not the trainee fires a weapon and hits said target area of said screen during a predetermined time period when a portion of the image of the body of said suspect is coincident with said target area, i. following one of at least two alternative procedures depending upon whether or not said projectile hits said target area during said predetermined time period, the first of said alternative procedures being to project on said screen a first alternative film scene showing said suspect in a dead or dying condition, and being followed if said projectile does strike said target area during said predetermined time period, the second of said alternative procedures being to project on said screen a second alternative film scene showing said suspect firing at said trainee, and being followed if said projectile does not strike said target area during said predetermined time period, and j. creating physical and psychological responses in said trainee if said second of said alternative procedures was followed, said responses being related to the wounding of said trainee by said suspect.

6. Training apparatus comprising
a plurality of film projectors for projecting image sequences from first and second films, at least said first film including a first scene comprising a first group of frames and a second scene comprising a second group of frames, means for producing a first scene identifying signal as frames of said first group are projected and for producing a second scene identifying signal as frames of said second group are projected, a screen, means for causing said first film to be projected thereon, means for firing a projectile at the screen, control means for controlling said projectors, a first sensor for generating a first action signal in response to the firing of said projectile, first logic means responsive to said first action signal and to said first scene identifying signal for operating said control means to stop projection of said first film upon the screen and start projection of the second film upon the screen, said control means including means for controlling termination of projection of said second scene, a second sensor associated with the screen for generating a second action signal indicative of the accuracy of the firing of said projectile at the screen, and second means responsive to said second scene identifying signal and to said second action signal for operating said control means to stop projection of said first film upon the screen.

7. The apparatus of claim 6 wherein said control means includes means for stopping projection of said first film if a predetermined accuracy of the projectile firing exists and starting projection of a third film upon the screen.

8. The training apparatus of claim 7 wherein said first logic means comprises a coincidence gate responsive to simultaneous occurrence of said first action signal and said first scene identifying signal and wherein said second logic means comprises a second coincidence gate responsive to simultaneous occurrence of said second scene identifying signal and said second action signal.

9. The apparatus of claim 6 wherein said first scene presents the image of a decoy simulating a suspect, wherein said first sensor comprises a microphone responsive to the sound of said projectile firing an independent of the accuracy of the projectile firing, wherein said second scene comprises the image of a suspected assailant and wherein said second sensor comprises means on the screen for detecting impact of a projectile thereon.

10. The training apparatus of claim 6 wherein said means for producing a first scene identifying signal comprises a pattern of opaque and transparent areas on each of the frames of said first group of frames, whereby said first logic means will receive said first scene identifying signal substantially throughout the projection of said first scene, said first sensor comprising a photosensitive detector mounted to said screen for illumination by said pattern of opaque and transparent areas.

* * * * *